GLASS-ENCASED ELECTRIC FUSES

Filed Nov. 6, 1964

United States Patent Office 3,304,394
Patented Feb. 14, 1967

3,304,394
GLASS-ENCASED ELECTRIC FUSES
Angelo Urani, St. Louis, Mo., assignor to McGraw-Edison Company, Elgin, Ill., a corporation of Delaware
Filed Nov. 6, 1964, Ser. No. 409,365
8 Claims. (Cl. 200—131)

Figure 1:
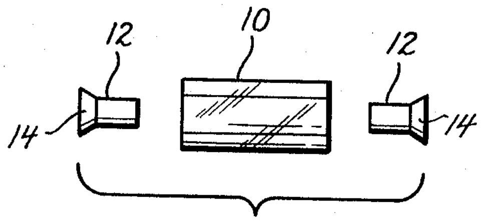

This invention relates to improvements in protectors for electric circuits. More particularly, this invention relates to improvements in electric fuses.

It is, therefore, an object of the present invention to provide an improved electric fuse.

This invention is an improvement upon the invention disclosed in Letters Patent No. 3,023,289 for Protectors for Electric Circuits which were granted February 27, 1962.

The electric fuse of the said Letters Patent has a glass tube with masses of solder that close and seal the ends of that tube. The edges of those masses of solder are, necessarily, irregular, and hence, the minimum distance along the exterior of that glass tube, between those masses of solder, is necessarily unpredictable. This means that to be certain of keeping current from "leaking" along the exterior of the glass tube of the electric fuse of said Letters Patent, the length of that glass tube must be made longer than desired or that electric fuse must be embedded within an insulating compound. It would be desirable to provide an electric fuse that was similar to the electric fuse of said Letters Patent but which did not have to be embedded within an insulating compound and which could be made with a shorter glass tube. The present invention provides such an electric fuse; and it does so by disposing eyelets in the ends of the glass tube of that fuse to receive the end-closing masses of solder and to precisely determine and fix the minimum distance, along the exterior of the glass tube, between those masses of solder. Because that minimum distance can be precisely determined and fixed, it is not necessary to embed the electric fuse in an insulating compound, and it is possible to make the glass tube of that electric fuse shorter than the glass tube of the electric fuse of said Letters Patent and still keep current from "leaking" along the exterior of that glass tube. It is, therefore, an object of the present invention to provide an electric fuse which has a glass tube with eyelets within the ends thereof to receive end-closing masses of solder and to precisely determine and fix the minimum distance, along the exterior to the glass tube, between those masses of solder.

The end-closing masses of solder of the electric fuse provided by the present invention close the eyelets of that electric fuse and can project short distances outwardly beyond the outer ends of those eyelets. However, those masses of solder will not overlie the ends of the glass tube and will not extend toward each other, as do the solder masses in the electric fuse of said Letters Patent. As a result, the electric fuse of the present invention is free of the end caps, and is free of the overlying masses of solder, which characterize prior electric fuses; and, because that electric fuse is free of such end caps and is free of such overlying masses of solder, that electric fuse could be made with a very short glass tube and still keep current from "leaking" along the exterior of that glass tube. It is, therefore, an object of the present invention to provide an electric fuse that has a glass tube with eyelets in the ends thereof and that has masses of solder which fill those eyelets but which do not overlie the ends of that tube.

In making the electric fuse of said Letters Patent, a metallic coating is applied to the ends of the glass tube for that fuse, and then that glass tube is "fired" to cause that coating to permanently adhere to those ends. Thereafter a layer of metal, to which solder can readily adhere, is formed on that coating by an electroplating process. Finally, the fusible element and the leads are telescoped into the glass tube; and then solder is used to bond those leads to the fusible element and also to bond that fusible element and those leads to the electroplated layer on the coating, thereby forming a seal. While that electric fuse is very useful, it is expensive to manufacture. It would be desirable to provide an electric fuse that was comparable to the electric fuse of said Letters Patent but which could be manufactured with less cost. The present invention provides such an electric fuse; and it is, therefore, an object of the present invention to provide a glass tube fuse which can be hermetically sealed and which can be manufactured inexpensively.

The eyelets within the glass tube of the electric fuse provided by the present invention are heat sealed to that glass tube; and the fusible element and the leads of that electric fuse are intimately soldered to those eyelets. As a result, the eyelets coact with the solder to provide a hermetically sealed glass tube fuse. The heat sealing of the eyelets to the glass tube obviates the coating, the "firing," and the electroplating steps used in making the fuse of said Letters Patent; and thus reduces the cost of making such a fuse. As a result, the electric fuse provided by the present invention can be hermetically sealed and yet can be made inexpensively. It is, therefore, an object of the present invention to provide an electric fuse which has a glass tube, which has eyelets disposed within the ends of that tube, which has those eyelets heat sealed to those ends, and which has solder that bonds the fusible element and the leads to those eyelets.

The eyelets provided by the present invention are made from a material which has a thermal coefficient of expansion that is generally similar to the thermal coefficient of the glass of the glass tube. Consequently, when the glass tube and the eyelets cool after the heat sealing step, the eyelets will not tend to shrink away from the ends of the glass tube and thereby produce minute openings or passages for air. Instead, the glass tube and the eyelets will shrink at about the same rate, and will thus maintain an intimate and air-tight seal therebetween. It is, therefore, an object of the present invention to provide an electric fuse which has a glass tube with eyelets that are heat sealed within the opposite ends thereof, and wherein the eyelets and the glass tube have about the same thermal coefficient of expansion.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
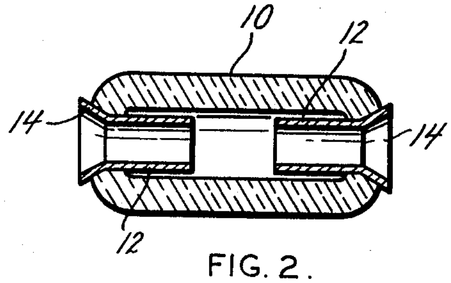
Figure 3:
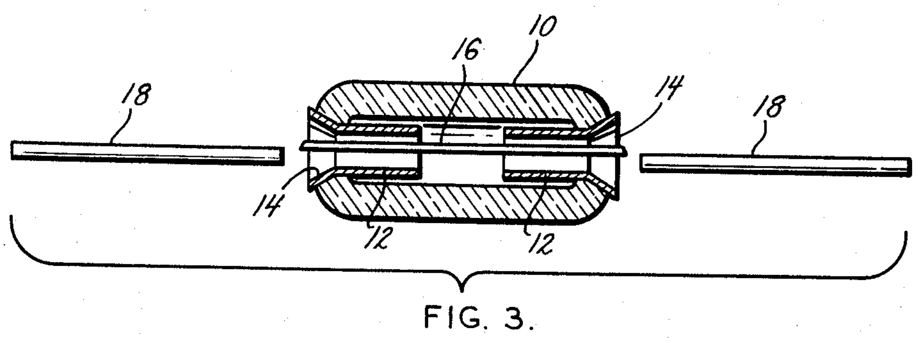
Figures 4, 5:
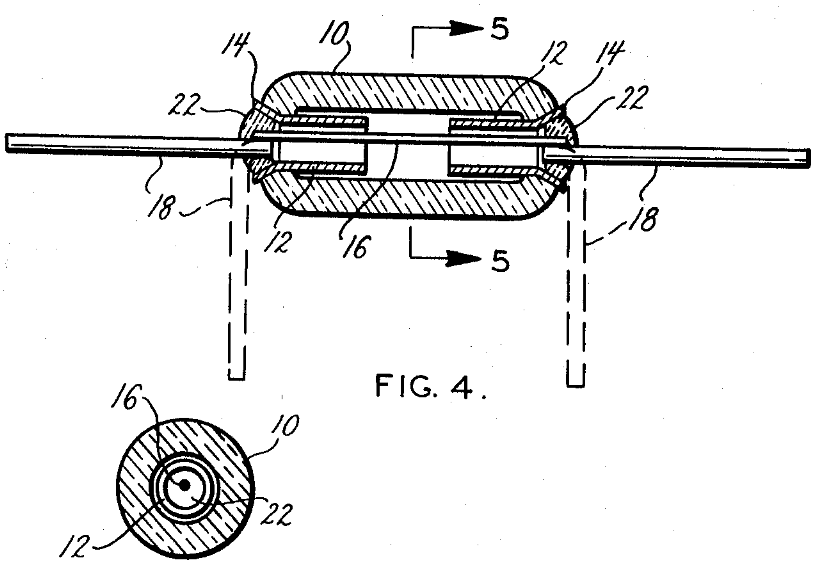

In the drawing:

FIGURE 1 is a side elevational view of the glass tube and eyelets for one preferred embodiment of electric fuse that is made in accordance with the principles and teachings of the present invention, and it shows that tube and eyelets before they are assembled, FIGURE 2 is a longitudinal section, on a larger scale, through the glass tube and eyelets of FIGURE 1 after that tube has been heat sealed to those eyelets, FIGURE 3 is a longitudinal section, on the scale of FIGURE 2, through the heat sealed glass tube and eyelets of FIGURE 2 plus the leads or terminals which are to be soldered to those eyelets, FIGURE 4 is a longitudinal section, on the scale of FIGURE 2, through the glass tube, eyelets and leads of FIGURE 3 after a fusible element has been telescoped into that tube and solder has been used to close those eyelets and to bond that fusible element to those eyelets, and FIGURE 5 is a sectional view, on the scale of FIGURE 2, through the glass tube and fusible element of FIGURE 4, and it is taken along the plane indicated by the line 5—5 in FIGURE 4.

Referring to the drawing in detail, the numeral 10 denotes the glass tube of one preferred form of electric fuse that is made in accordance with the principles and teachings of the present invention. To provide a fully detailed disclosure of the structure of that glass tube, FIGURE 1 has been made many times larger than the actual size of that tube—that tube having an overall length of less than three-tenths of an inch and having an overall diameter of about one hundred and twenty-five thousandths of an inch. The numeral 12 denotes eyelets which are generally cylindrical but which have frusto-conical outer ends 14. Those eyelets are made from a material which has about the same thermal coefficient of expansion as the glass of the glass tube 10. Examples of materials which can be used to make the eyelets 12 are Kovar, Fernico, Therlo, and Rodar—those materials being iron alloys containing about twenty-eight percent nickel and about eighteen percent cobalt. Other examples of materials which can be used to make the eyelets 12 are Nilvar, 142 Alloy, 152 Alloy, Niromet 42, Niron, Sealmet-1, Ascaloy 446, Carpenter 27, Telemet, molybdenum, platinum, and tungsten. The eyelets 12 have the inner surfaces thereof and the inner surfaces of the frusto-conical ends 14 thereof overlain by an electroplated layer of tin, copper, or some other material to which solder readily adheres. The outer diameters of the cylindrical portions of the eyelets 12 are slightly smaller than the inner diameter of the glass tube 10, but the outer diameters of the large diameter portion of the frusto-conical ends 14 of those eyelets are larger than the inner diameter of that tube. As a result, the cylindrical portions of the eyelets 12 can be readily telescoped within the ends of the tube 10, but the outer surfaces of the frusto-conical ends 14 will act as stops and will limit movement of those eyelets into the ends of that tube.

Once the eyelets 12 have been telescoped within the ends of the tube 10, the ends of that tube will be heated. Preferably, the ends of that tube will be heated by directing a flame onto them. Those ends will respond to the heating thereof to soften and become plastic; and, as those ends become soft and plastic, they will draw themselves into intimate engagement with parts of the cylindrical portions of the eyelets 12 and with parts of the outer surfaces of the frusto-conical ends 14 of those eyelets. The heating of the ends of the tube 10 will be continued until an air-tight seal is established between those ends and the eyelets 12 and the frusto-conical ends 14 thereof. Subsequently, the tube 10 and the eyelets 12 mounted therein will be permitted to coil; and, because the glass of the tube 10 and the material of the eyelets 12 have about the same thermal coefficient of expansion, the air-tight seal between those eyelets and that tube will be preserved.

The numeral 16 denotes a fusible element which is wire-like and which has a diameter that is considerably smaller than the inner diameter of either of the eyelets 12. As a result, that fusible element can be readily telescoped through those eyelets and through the tube 10. The numeral 18 denotes the leads or terminals for the electric fuse; and those leads or terminals can be straight, as shown by solid lines in FIGS. 3 and 4, or can have bent ends, as shown by dotted lines in FIGURE 4. The inner ends of those leads telescope into the frusto-conical ends 14 of the eyelets 12, as shown particularly by FIGURE 4. Masses 22 of solder are used to fill those frusto-conical ends 14 and thereby seal those ends and bond the fusible element 16 to the leads 18. As a result, those masses of solder provide an intimate electrical engagement between the leads 18 and the fusible element 16, and also hermetically close and seal the eyelets 12.

If desired, the fusible element 16 can be threaded through the eye of a needle, and then that needle can be used to pass that fusible element through a glass tube 10 which has eyelets 12 sealed in the ends thereof. Thereafter, the ends of the leads 18 can be telescoped into the frusto-conical ends 14 of the eyelets 12 within that tube; and, while the ends of those leads are disposed within those frusto-conical ends, masses 22 of solder can be applied to the ends of those leads, to the projecting ends of the fusible element 16, and to the inner faces of the frusto-conical ends 14. Those masses of solder will electrically bond the leads 18 to the fusible element 16, and those masses of solder will also close and hermetically seal the outer ends of the eyelets 12. Because the ends of the tube 10 were previously heat sealed to the eyelets 12 in air-tight relation, the masses of solder will complete the hermetic sealing of the fuse. Thereafter, any portions of the fusible element 16 which project outwardly beyond the masses of solder can be cut off and discarded.

It should be noted that the masses 22 of solder fill the frusto-conical ends 14 of the eyelets 12 but do not project radially outwardly beyond the edges of the large diameter portions of those frusto-conical ends. As a result, it is the eyelets 12, and not the masses 22 of solder, which determine and fix the minimum distance, along the surface of the tube 10, between the electrically "alive" portions of the electric fuse. Further, it should be noted that the eyelets 12 do not overlie the ends of the tube 10 and do not extend toward each other, and hence the full length of the glass tube 10 is available to keep current from "leaking" along the exterior of that tube.

If desired, the eyelets 12 could be provided with tangs or ears that projected outwardly or laterally from the outer edges of the frusto-conical ends 14. Those tangs or ears could serve as leads which are integral with those eyelets; and it will be understood that the word "leads" comprehends such tangs or ears.

Whereas the drawing and accompanying description have shown and described a preferred embodiment of the present invention it should be apparent to those skilled in the art that various changes may be made in the form of the invention without affecting the scope thereof.

What I claim is:

1. An electric fuse that comprises:
(a) a glass tube,
(b) eyelets disposed within, and heat sealed to, the ends of said tube,
(c) said eyelets being generally cylindrical and having frusto-conical outer ends,
(d) the outer diameters of the cylindrical portions of said eyelets being smaller than the normal inner diameter of said glass tube,
(e) the outer diameters of the large diameter portions of said frusto-conical ends of said eyelets being larger than the normal inner diameter of said glass tube,
(f) said ends of said glass tube having inner diameters which are smaller than the normal inner diameter of said glass tube, and said ends being heat sealed into engagement with the outer surfaces of said cylindrical portions of said eyelets and with the outer surfaces of said frusto-conical ends of said eyelets,
(g) a fusible element extending through said eyelets and through said tube,
(h) leads which have ends extending into said frusto-conical ends of said eyelets, and
(i) solder that closes said frusto-conical ends of said eyelets,
(j) said solder electrically bonding said leads to said fusible elements and hermetically closing and sealing said eyelets, (k) said eyelets and said glass tube having substantially the same thermal coefficients of expansion,
(l) said frusto-conical ends limiting the extent to which said solder can extend toward the ends of said glass tube,
(m) said frusto-conical ends defining the minimum distance, along the exterior of said tube, between the electrically-alive components of said fuse.

2. An electric fuse that comprises:
(a) a glass tube,
(b) eyelets disposed within, and heat sealed to, the ends of said tube,
(c) said eyelets being generally cylindrical and having frusto-conical outer ends,
(d) the outer diameters of the cylindrical portions of said eyelets being smaller than the normal inner diameter of said glass tube,
(e) the outer diameters of the large diameter portions of said frusto-conical ends of said eyelets being larger than the normal inner diameter of said glass tube,
(f) said ends of said glass tube having inner diameters which are smaller than the normal inner diameter of said glass tube, and said ends being heat sealed into engagement with the outer surfaces of said cylindrical portions of said eyelets and with the outer surfaces of said frusto-conical ends of said eyelets,
(g) a fusible element extending through said eyelets and through said tube,
(h) leads which have ends extending into said frusto-conical ends of said eyelets, and
(i) solder that closes said frusto-conical ends of said eyelets,
(j) said solder electrically bonding said leads to said fusible elements and hermetically closing and sealing said eyelets,
(k) said frusto-conical ends defining the minimum distance, along the exterior of said tube, between the electrically-alive components of said fuse.

3. An electric fuse that comprises:
(a) a glass tube,
(b) eyelets disposed within, and heat sealed to, the ends of said tube,
(c) said eyelets being generally cylindrical and having frusto-conical outer ends,
(d) the outer diameters of the cylindrical portions of said eyelets being smaller than the normal inner diameter of said glass tube,
(e) the outer diameters of the large diameter portions of said frusto-conical ends of said eyelets being larger than the normal inner diameter of said glass tube,
(f) said ends of said glass tube having inner diameters which are smaller than the normal inner diameter of said glass tube, and said ends being heat sealed into engagement with the outer surfaces of said cylindrical portions of said eyelets and with the outer surfaces of said frusto-conical ends of said eyelets,
(g) a fusible element extending through said eyelets and through said tube,
(h) leads which have ends extending into said frusto-conical ends of said eyelets, and
eyelets,
(j) said solder electrically bonding said leads to said fusible elements and hermetically closing and sealing said eyelets,
(k) said eyelets and said glass tube having substantially the same thermal coefficients of expansion.

4. An electric fuse that comprises:
(a) a glass tube,
(b) eyelets disposed within, and heat sealed to, the ends of said tube,
(c) said eyelets being generally cylindrical and having frusto-conical outer ends,
(d) the outer diameters of the cylindrical portions of said eyelets being smaller than the normal inner diameter of said glass tube,
(e) the outer diameters of the large diameter portions of said frusto-conical ends of said eyelets being larger than the normal inner diameter of said glass tube,
(f) said ends of said glass tube having inner diameters which are smaller than the normal inner diameter of said glass tube, and said ends being heat sealed into engagement with the outer surfaces of said cylindrical portions of said eyelets and with the outer surfaces of said frusto-conical ends of said eyelets,
(g) a fusible element extending through said eyelets and through said tube,
(h) leads which have ends extending into said frusto-conical ends of said eyelets, and
(i) solder that closes said frusto-conical ends of said eyelets.

5. An electric fuse that comprises:
(a) a glass tube,
(b) eyelets disposed within, and heat sealed to, the ends of said tube,
(c) said eyelets having generally tubular, small diameter, inner ends and enlarged outer ends,
(d) the outer diameters of the inner ends of said eyelets being smaller than the normal inner diameter of said glass tube,
(e) the outer diameters of the enlarged outer ends of said eyelets being larger than the normal inner diameter of said glass tube,
(f) said ends of said glass tube extending inwardly beyond the normal inner diameter of said glass tube and having inner diameters which are smaller than the normal inner diameter of said glass tube, and said ends being heat sealed into engagement with the enlarged outer ends of said eyelets,
(g) a fusible element extending through said eyelets and through said tube,
(h) leads which have ends extending into said enlarged outer ends of said eyelets, and
(i) solder that closes said enlarged outer ends of said eyelets,
(j) said solder electrically bonding said leads to said fusible elements and hermetically closing and sealing said eyelets,
(k) said glass tube providing an insulating surface, at the exterior of said electric fuse and intermediate said enlarged outer ends of said eyelets, that is substantially as long as the length of said glass tube,
(l) said enlarged outer ends of said eyelets projecting transversely outwardly of said ends of said glass tube to receive and hold said solder and to constitute barriers between said solder and the outer surface of said glass tube.

6. An electric fuse that comprises:
(a) a glass tube,
(b) eyelets having portions thereof disposed within, and heat sealed to, the ends of said tube,
(c) a fusible element extending through said eyelets and through said tube,
(d) leads which have ends extending into said eyelets, and
(e) solder that closes said eyelets,
(f) solder electrically bonding said leads to said fusible elements and hermetically closing and sealing said eyelets,
(g) said eyelets having other portions thereof projecting transversely outwardly of said ends of said glass tube to receive and hold said solder and to constitute barriers between said solder and the outer surface of said glass tube, thereby limiting the extent to which said solder can extend toward the ends of said glass tube,
(h) said eyelets defining the minimum distance, along the exterior of said tube, between the electrically-alive components of said fuse, (i) said eyelets and said glass tube having substantially the same thermal coefficients of expansion.

7. An electric fuse that comprises:

(a) a glass tube, (b) eyelets having portion thereof disposed within, and heat sealed to, the ends of said tube, (c) a fusible element extending through said eyelets and through said tube, (d) leads which have ends extending into said eyelets, and (e) solder that closes said eyelets, (f) said solder electrically bonding said leads to said fusible elements and hermetically closing and sealing said eyelets, (g) said eyelets having other portions thereof projecting transversely outwardly of said ends of said glass tube to receive and hold said solder and to constitute barriers between said solder and the outer surface of said glass tube, thereby limiting the extent to which said solder can extend toward the ends of said glass tube.

8. An electric fuse that comprises:

(a) a glass tube, (b) eyelets having portions thereof disposed within and sealed to the ends of said tube, (c) a fusible element extending through said eyelets and through said tube, (d) leads for said electric fuse, and (e) solder that closes said eyelets, (f) said solder electrically bonding said leads to said fusible elements and hermetically closing and sealing said eyelets, (g) said eyelets having other portions thereof projecting transversely outwardly of said ends of said glass tube to receive and hold said solder and to constitute barriers between said solder and the outer surface of said glass tube, thereby limiting the extent to which said solder can extend toward the ends of said glass tube, (h) said eyelets defining the minimum distance, along the exterior of said tube, between the electrically-alive components of said fuse.

References Cited by the Examiner

UNITED STATES PATENTS

| | | | |
|---|---|---|---|
| 807,093 | 12/1905 | Sachs | 200—132 |
| 2,218,912 | 10/1940 | Huber | 200—117 |
| 2,302,820 | 11/1942 | Van Liempt | 200—113 |
| 2,577,899 | 12/1951 | Linton | 200—125 X |
| 2,815,474 | 12/1957 | Lewis et al. | |
| 2,974,208 | 3/1961 | Sundt | 200—131 |

BERNARD A. GILHEANY, *Primary Examiner.*